US008525364B1

(12) United States Patent
Costas et al.

(10) Patent No.: US 8,525,364 B1
(45) Date of Patent: Sep. 3, 2013

(54) APPARATUS FOR CONVERTING WAVE ENERGY

(71) Applicants: Dan Nicolaus Costas, Culver City, CA (US); Alexander Nicholas Costas, Culver City, CA (US)

(72) Inventors: Dan Nicolaus Costas, Culver City, CA (US); Alexander Nicholas Costas, Culver City, CA (US)

( * ) Notice: Subject to any disclaimer, the term of this patent is extended or adjusted under 35 U.S.C. 154(b) by 0 days.

(21) Appl. No.: 13/757,621

(22) Filed: Feb. 1, 2013

Related U.S. Application Data

(60) Provisional application No. 61/634,105, filed on Feb. 23, 2012, provisional application No. 61/687,897, filed on May 3, 2012.

(51) Int. Cl.
*F03B 13/24* (2006.01)
(52) U.S. Cl.
USPC ............. 290/53; 290/42; 60/398; 60/497

(58) Field of Classification Search
USPC .............. 290/53, 54, 42, 43; 60/398, 497
IPC .............................. F03B 13/10, 13/14
See application file for complete search history.

(56) References Cited

U.S. PATENT DOCUMENTS

| | | | | |
|---|---|---|---|---|
| 4,095,423 A | * | 6/1978 | Gorlov | 60/398 |
| 4,098,081 A | * | 7/1978 | Woodman | 60/398 |
| 4,141,670 A | * | 2/1979 | Russell | 415/3.1 |
| 4,210,821 A | * | 7/1980 | Cockerell | 290/53 |

* cited by examiner

*Primary Examiner* — Vanessa Girardi
(74) *Attorney, Agent, or Firm* — Marc E. Hankin; Kevin Schraven; Jimmy Sauz

(57) ABSTRACT

The invention is an apparatus and method for harnessing wave energy by transforming it in a continuous flow of water to be converted in mechanical energy through a water turbine. The energy wave device maximizes the throughput by discharging the water crest in a continuous flow through turbines into the trough, absorbing the water of the neighboring wave's crest and sharing the facilities.

20 Claims, 2 Drawing Sheets

APPARATUS FOR CONVERTING WAVE ENERGY

CROSS-REFERENCE TO RELATED APPLICATIONS

Priority is claimed to U.S. Provisional Patent Application Ser. No. 61/634,105, filed on Feb. 23, 2012, titled "APPARATUS FOR CONVERTING WAVE ENERGY," by inventor Dan Nicolaus Costas, the contents of which are expressly incorporated herein by this reference. Priority is also claimed to U.S. Provisional Patent Application Ser. No. 61/687,897, filed on May 3, 2012, titled "APPARATUS FOR CONVERTING WAVE ENERGY," by inventors Dan Nicolaus Costas and Alexander Nicholas Costas, the contents of which are expressly incorporated herein by this reference.

FIELD OF INVENTION

This invention relates to the method and apparatus for converting the wave energy into electrical energy by converting the raised level of water accumulated from the waves. More particularly, the invention relates to a method and apparatus for converting the random bursts of energy given by waves into a continuous flow of water capable of powering a low head turbine.

BACKGROUND

For over a century, hundreds of inventions have attempted to harness the vast amount of energy in waves. Due to scarcity of resources and energy, a lot of effort has been directed towards tapping into the vast amount of unharnessed natural resources. One such form of unharnessed natural resources is in the form of wave energy.

Ocean's waves contain more energy that can be harnessed than wind and solar energy combined. This energy is constantly available and oceans cover over 70% of the earth's surface.

It has been estimated that waves can contain as much as 70 KW of power for every linear meter of wave; therefore a 15 meter long wave can deliver over 1 MW of power if its energy could be exploited in a practical manner.

The methods currently employed for extracting the wave's energy fall basically in to four main categories:

Point absorbers, which are buoys using the heaving motion of the waves that is being converted to mechanical and than electrical energy, or directly to electrical energy like Power Buoy of Ocean Power Technology.

Attenuators, like McCabe's Wave Pump or "Pelamis" which use a few floating bodies hinged together which are in relative motion to each other due to the passing waves. At the hinging point, hydraulic pistons push oil in hydraulic motors which in turn actuate electric generators.

Terminators, like Oscillating Water Column (OWC) employed in the "Mighty Whale" Japanese project or in various shore based projects like the one on the Pico island.

Overtopping, employed either on shore or on a floating structure like the "Wave Dragon" Danish project which also involves Germany, Sweden, The UK, and Austria.

The first two categories employ mechanical devices that are inefficient and demand a high capital cost due to the demanding conditions out in the ocean. The seals needed, the inability to service on the spot, the dangerous conditions of even approaching the devices to be tugged for service make them undesirable as viable solutions. They also need a long "trial and error" validation period because they are not proven in time technologies.

The last two categories use the wave's energy to actuate air, and their water turbines actuate electrical generators. The current invention falls into this broad category, so this category will be further analyzed.

The OWC is mostly used on shores where a trapezoidal chamber communicates on the lower side with the sea water allowing the incoming wave to raise the inside level of water. When the wave retreats, on a through, the level of the water inside will drop. This raising and lowering of the water level inside the chamber acts as a piston, pushing and pulling the air above it through a narrow hole where a Wells turbine rotates, actuating an electric generator.

The Wells turbine, named after its inventor is a self rectifying turbine, which rotates in the same direction regardless of the direction where the air is coming from. The advantage of this concept is a simple design that has no moving parts except the group of turbine-generator.

The disadvantages of this system are: low efficiency of the air turbine, a chamber of limited size which cannot be bigger than the order of magnitude of a wave which requires a separate chamber for each separate turbine-generator, chambers cannot be coupled to actuate one bigger turbine generator group, and lost kinetic energy of the wave because the separating wall of the chamber is always submerged.

The existing OWC systems are mostly placed on shore where the waves have already lost most of the energy they had in deep sea water. Also, the sites need to have a particular configuration, and typically involve expensive real estate.

Due to the fact that there is a significant period of time between waves and also because the wave's lowering is slower than the rising level inside the chamber, the Wells turbine tends to stall.

Another drawback is that because the air turbine is so noisy, this limits the number of sites where it can be implemented.

Overtopping is used on the "Wave Dragon", which is a floating structure that has a ramp (artificial beach) on which the wave climbs due to its kinetic energy and spills over into a basin above the sea water level. Then the water falls through a water turbine and actuates an electric generator much like in a regular hydro power plant. This simplicity is an advantage of the "Wave Dragon." Another obvious advantage of this design is the use of a technology that has long been used and perfected.

Water turbines which are suitable for this purpose have been used in low head river water power plants for many decades and have been developed to a high level of efficiency and reliability. In France the 240 MW La Rance tidal power station has been using such turbines in a salt water environment since 1967. Thus, in contrast to most of the WEC principles, a proven and mature technology can be used for the production of electrical energy.

Turbine operating conditions in a WEC are quite different from the ones in a normal hydro power plant. In the Wave Dragon, the turbine head range is typically between 1.0 and 4.0 m, which is on the lower bounds of existing water turbine experience. While there are only slow and relatively small variations of flow and head in a river hydro power plant, the strong stochastic variations of the wave overtopping call for a radically different mode of operation in the Wave Dragon. The head, being a function of the significant wave height, is varying in a range as large as 1:4, and it has been shown by Knapp (2005) that the discharge has to be regulated within time intervals as short as ten seconds in order to achieve a good efficiency of the energy exploitation.

A river hydro power plant which is properly maintained can have a life of 40-80 years. On an unmanned offshore device, the environmental conditions are much rougher, and routine maintenance work is much more difficult to perform. Special criteria for the choice and construction of water turbines for the Wave Dragon have to be followed; it is advisable to aim for constructional simplicity rather than maximum peak efficiency.

By stopping a number of turbines at lower flow rates, the flow rate can be regulated over a wider range without sacrificing efficiency. Single units can be taken out of service for maintenance without stopping production. Capacity demanded for hoisting and transport equipment to perform repair and maintenance work is greatly reduced. The smaller turbines have shorter draft tubes, and are thus easier to accommodate in the whole device. The smaller turbines have a higher speed, which reduces the cost of the generator. Another advantage of the Wave Dragon by being a floating structure is the possibility of being moored in deep waters where the energy of the wave is not diminished by the sea floor and there is no real estate cost involved.

There are quite a few important drawbacks of the overtopping devices, and in particular, the Wave Dragon.

The capacity of the water reservoir has to be significant to feed the turbine between two waves. It is 8,000 cubic meters which means over 8,000 tons of water to be lifted and held above the sea level in a precarious act of balancing. It is like a plate filled with water which easily will spill when shaken. The structure to hold all this weight becomes significantly bulky and expensive. The mooring lines and anchoring will have to be dimensioned accordingly mostly taking also in consideration the two floating wings that spread sideways to gather the waves giving a span of 300 meters to the whole structure.

Underneath there are pockets of air for lifting and lowering the structure such that always the ramp is at the proper height depending on the height of the incoming waves. If the ramp is too high, the incoming wave may not make it over or too little water will be added to the reservoir. If the ramp is too low, the water will just wash over the reservoir not giving enough head for the turbine.

A sophisticated "just in time" automation system will have to keep this huge structure in balance at all times since the level of the ramp has to continuously keep up with the surrounding conditions, the amount of momentary load (variations of thousands of tons of water weight of load on the structure in a matter of seconds between waves), the task of keeping an even keel, horizontal position at all times in choppy waters. The turbines are equipped with cylindrical vanes that close when there is not enough head and reopen when enough flow of water is assured. In stormy weather the structure sinks to a standby low profile by letting out the air of the air pockets.

Most of the kinetic energy of the incoming wave is cancelled by the vertical component of the ramp to push over the upper edge of the ramp from where the water falls to a lower level in the reservoir to a lower potential energy. This amounts to lower efficiency in the process of conversion of the wave's energy. If somehow, the top of the ramp could be continuously adjusted with the water level inside the reservoir, this would always be the optimum level over which the water in the wave will spill.

If also somehow the gap between the waves could be bridged, a continuous flow of water into the reservoir would keep up with the continuous demand of the turbine and the big buffering reservoir won't be necessary.

A more efficient less expensive structure would assure the continuous functioning of the already described water turbine generator group. The proposed invention solves these problems.

The invention assures the conversion of the kinetic and potential wave energy in a continuous flow of water feeding a water turbine.

Finally, the present invention is a significant improvement over U.S. Pat. No. 7,834,475, which was issued to Dan Nicolas Costas, a named inventor of the present invention. The present invention is able to collect significantly more water into the flow that is powering the turbines by allowing the side wave crest that is in the vicinity of the apparatus to enter the system as it travels along it, in addition to the crest that hits the device frontally. Additionally, the present invention is simpler and less expensive to build due to the flap grid combination working as one way valves. Finally, the present invention may be modular and standardized and would therefore less expensive and easier to service.

SUMMARY OF THE INVENTION

To minimize the limitations of the prior art, and to minimize other limitations that will become apparent upon reading and understanding the present specification, the present invention is a method and apparatus for converting the energy of waves in a continuous flow of water capable to actuate a hydro turbine which in turn actuates an electrical power generator.

The generated flow of water powers preferably a plurality of hydro turbines, similar to any low head hydro power plant, thus using well verified and optimized in time technology.

Since the power of a turbine is direct proportional with the head and the debit of water, a high volume of water is needed for a significant amount of power. For this, the waves should be transformed as much as possible in a continuous and large flow of water.

Having electrical power generated on board, desalination, hydrogen generating and modular locative spaces can be added and easily connected to the structure.

One embodiment of the invention is a device for converting the energy of waves in continuous flow of water comprising: one or more input channels; one or more output channels; one or more passages; one or more turbines; and one or more generators. The turbines are within the one or more passages. The input channels have one or more input valves. The one or more output channels have one or more output valves. The one or more input channels are connected to the one or more output channels through the one or more passages. The device for converting the energy of waves is submerged under a surface of a body of water and a plurality of waves passes over the device. The plurality of waves have a crest and a trough along each wave length. The length of the channels should cover a crest and a trough at all times for generating a continuous flow between crest and trough. If this condition is not being met, when there are no pressure differentials between the input and output channels, high pressure on input and low pressure on output channel, the system will stall A stream of water enters the one or more input channels through the one or more input valves under pressure of the plurality of wave crests, wherein the stream of water is prevented from exiting through the one or more input valves such that the stream of water passes through the one or more passages to the one or more output channels and out through the one or more output valves. The stream of water is prevented from entering through the one or more output valves; and wherein the stream of water is converted into a usable energy source by the one or more turbines and the one or more generators. Preferably, the device further comprises a flotation device; wherein the device and the floatation device host one or more wind turbines and/or one or more water desalination facilities and/or one or more hydrogen making facilities and/or one or more lodging or dwelling units. Preferably, the one or more input valves are comprised of one or more input flaps and one or more input grills and the one or more output valves are comprised of one or more output flaps and one or more output grills; wherein the one or more input grills are preferably exterior to the one or more input flaps and wherein the one or more input grills prevent the one or more input flaps from opening outward; and wherein the one or more output grills are preferably interior to the one or more output flaps and wherein the one or more output grills prevent the one or more output flaps from opening inward. Preferably, the flotation device, wherein the device and the floatation device host one or more lodging or dwelling units, one or more hydrogen making facilities; one or more water desalination facilities; and one or more wind turbines; wherein the device and the floatation device provides an area of calm water feasible for aquaculture, water sports, and mooring facilities. The device may be part of a pier and/or affixed to the sea floor and/or part of a floating structure. The floating structure may travel on the water to deliver electric power and desalinated water to remote coastal locations. The floating structure may be geostationary under its own power. The floating structure may be a platform for one or more businesses selected from the businesses consisting of factories, aquaculture farms, and hydroponic farms. The floating structure may be a breakwater to protect the seashore from erosion. The floating structure may be a refueling station for vessels. The floating structure is a prison. Because the device generates electricity, the floating structure may be self powered.

It is an object of the present invention to overcome the limitations of the prior art.

These, as well as other components, steps, features, objects, benefits, and advantages, will now become clear from a review of the following detailed description of illustrative embodiments, the accompanying drawings, and the claims.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot FIGS., and the detailed descriptions thereof, are to be regarded as illustrative in nature and not restrictive. Also, the reference or non-reference to a particular embodiment of the invention shall not be interpreted to limit the scope of the invention. It is the goal of this invention to provide a method of maximizing the conversion of wave's energy in a continuous flow of water that actuates one or more water turbines.

Figure 1:
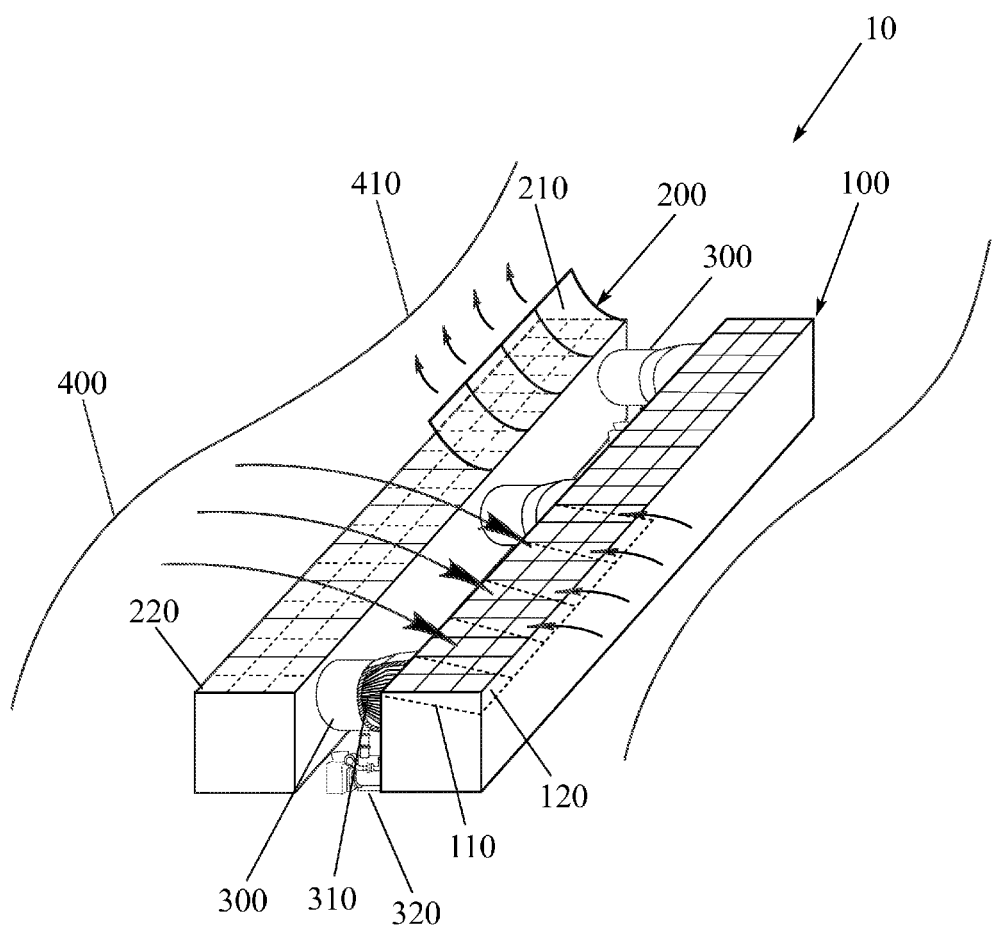
FIG. 1 is a prospective view of the device for converting wave energy in a continuous flow of water capable of powering low head water turbines.

FIG. 1 is a prospective view of the energy wave device for converting wave energy in a continuous flow of water capable of powering low head water turbines. As shown in FIG. 1, the energy wave device 10 is preferably comprised of one or more input channels 100, one or more input flaps 110, one or more input grills 120, one or more output channels 200, one or more output flaps 210, one or more output grills 220, one or more passages 300, one or more turbines 310, and one or more generators 320.

As shown in FIG. 1, one or more input channels 100 allow water to flow into the energy wave device 10 in one direction only, through valves, or input flaps 110, distributed along its length. As shown in FIG. 1, preferably, the input flaps 110 on the input channels 100 open inward. The input flaps 110 are prevented from opening outward, and letting the water flow out, by input grills 120. Because the resting position of input flaps 110 has the input flaps 110 pushing or resting against the input grills 120, the input flaps 110 are preferably made of a flexible and buoyant material.

As shown in FIG. 1, the output channels 200 similarly have one way out valves, or output flaps 210, distributed along its length. Preferably, the output flaps 210 open outward. The output flaps 210 are prevented from moving inward into output channels 200 by output grills 220, which are interior to the output flaps 210. Preferably, the output flaps 210 may be made of flexible material and have slightly greater density than water so the output flaps 210 rest against the output grills 220 when not pushed outward by the exiting water. The input and output grills 120 and 220 are preferably a grating or mesh or they may be made of crisscrossing strings or lines, such as fishing lines or tennis racket strings. The input and output grills 120 and 220, in combination with the input and output flaps 110 and 210, form a series of one valves, as shown in FIG. 1. Preferably, modular light-weight panels may be made for the input or output flaps 110 or 210 in advance, or restrung during service as needed. Preferably, the device is built in smaller framed modules of flap/grid pairs, which may then be put together like the tiles of a mosaic floor, and would cover the one way input of the input channels as well as the one way output of the output channels. Accordingly, the modules may be manufactured in an easy and less expensive manner in series as component parts of the system, and also can be removed and replaced easily, as needed for service or replacement purposes.

The input channels 100 and output channels 200 are connected by passages 300. Turbines 310 are mounted inside passages 300 and are coupled to electric generators 320. The present invention preferably is comprised of turbines and generators that are well known in the art. When water flows through the passages 300, the turbines 310 are turned and the generators 320, in turn, generate electric power.

This configuration of one (or more) input channel 100 and one (or more) output channel 200 connected through one (or more) passage 300, generates the continuous stream of water through the passages 300 when submerged in a body of water, such as the ocean, wherein waves roll over the wave energy device 10. As shown in FIG. 1, the waves preferably roll over the energy wave device, which is preferably perpendicular to the direction of travel of the wave. Preferably, the length of the input and output channels 100 and 200 is longer than, or at least as long as, a single wave length, such that there may be preferably a wave crest 400 and a wave trough 410, above a single input and output channel 100 and 200. The water from the crest 400 applies pressure to the tops of the input and output channels 100 and 200, but the water can only enter the input channels 100, due to the one way input flaps 110. The only way for the water that enters the device 10 to exit is to pass through passages 300, and thus drive turbine 310, and exit out through the output flaps 210, which is just under a water trough 410, where there is less pressure, as shown in FIG. 1.

As the water wave travels along the input and output channels 100 and 200, the part of the water crest 400 that is above the input channels 110 goes into the input channel 100, and the part of the wave that runs on the sides, which would not be used to drive the system otherwise, may flow towards and into the input channels 100 to fill the gap, as the wave travels along the device 10. Thus, the passage of the water waves through the device 10 provides a continuous flow of water that keeps being fed by the sides of the crest in the vicinity. Likewise, the water that gets expelled through the output flaps 210 of the output channel 200 into the trough 410 keeps flowing away from the vicinity to the lower level of the trough 410, allowing for the outgoing flow of the water.

As shown in FIG. 1, preferably the input and output channels 100 and 200 are submerged, such that the expelled water from the output channels 200 should be at least just below the lowest point of trough 410. The power of the turbine is, direct proportional to the head and the flow of water through the passages 300. Although the length of the input and output channels 100 and 200 is preferably longer than the average of expected wave length of the waves running above it and in its vicinity, the width and depth of the input and output channels may be such that the desired amount of water should flow freely through them when all passages 300 are open. When the wave environment is less than optimal (smaller waves with less energy), some, one, or more of the passages 300 may be closed, allowing the reduced flow to properly power the remaining turbines 310.

This combination of input channels 100 and output channels 200, connected through passages 300 on the devices 10, may be submerged under the waves in various configurations. For example, the devices 10 may be configured to be placed under piers, on imbedded legs, on floating platforms held above water, moored with umbilical power cables for delivering power to the grid, and/or simply in adjustable height floating configurations.

The energy wave device 10 can be used in order to create: self propelled floating islands, hydrogen refueling stations, desalinating water plants, electricity generators for remote coastal locations, hosts for wind turbines, or even hosts for mooring boats or floating dwelling units with all services based on the available on board electric power.

Because the whole system is preferably submerged, it is shielded from many adverse weather conditions. Preferably, the material that the device 10 is comprised of is concrete because it is inexpensive and resilient to a salt water environment. However, any resilient material may be used. Preferably, the flaps are inexpensive and easily serviceable or replaceable. Preferably, the turbines are low head Kaplan, or ultralow head for maximum efficiency.

Figure 2:
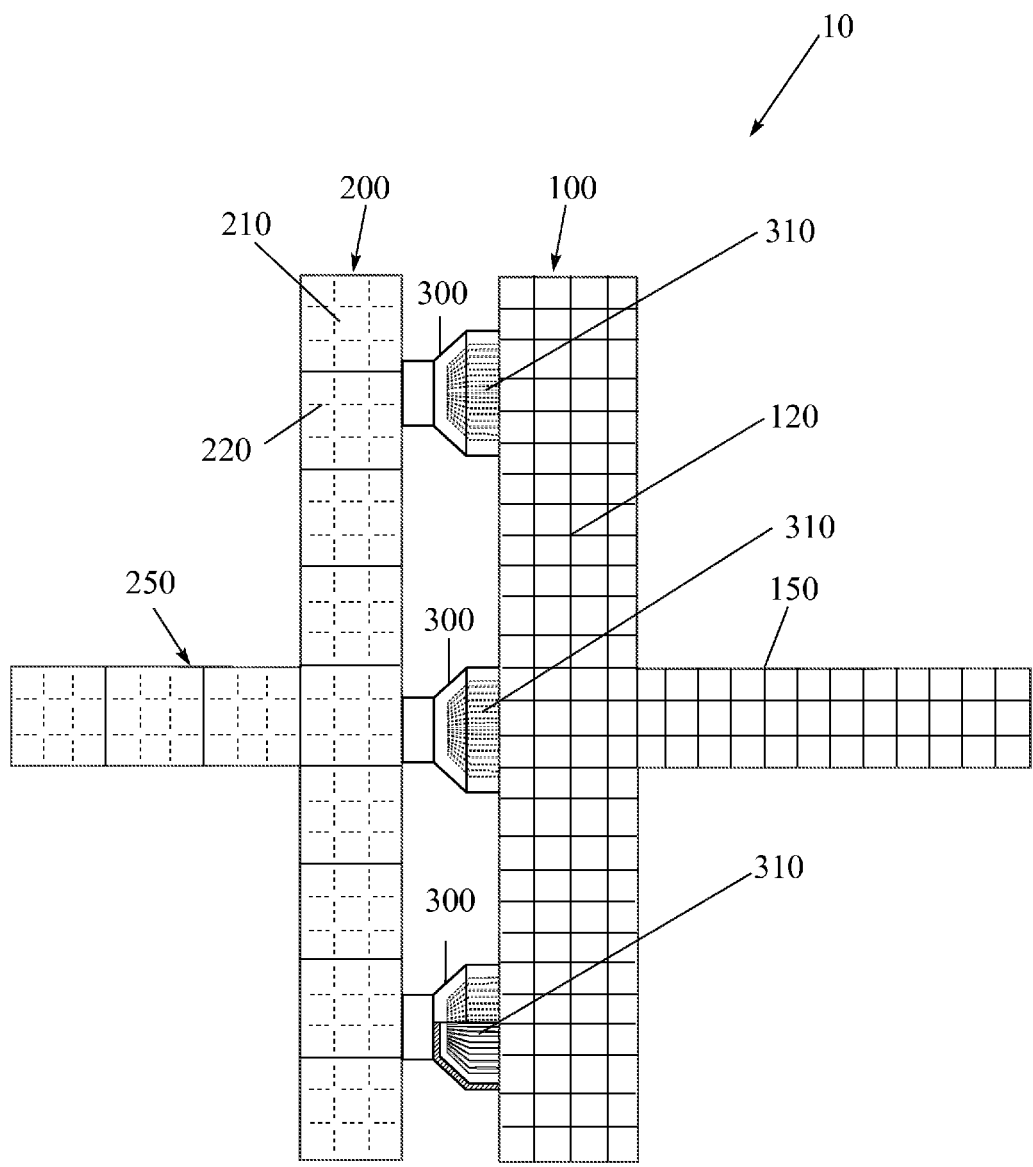
FIG. 2 is a top view of the device with more input and output channels extended in more than one direction for converting waves coming from different directions.

FIG. 2 is a top view of the energy wave device with more input and output channels extended in more than one direction for converting waves coming from different directions. Although the energy wave device 10 shown in FIG. 1 will more efficiently convert waves coming from a direction perpendicular to the channels 100 and 200, FIG. 2 shows that the device 10 may include additional input channels 150, which are preferably connected to the input channels 100. FIG. 2 also depicts additional output channels 250, which are preferably connected to output channels 200. This allows for the energy wave device to capture energy from waves moving in different direction or when the wave directions shift.

The channels 100 and 200 may also be basins of any shape, and they will generate a flow of water through the passages 300 so long as the raised pressure of the crest 400 on top of the input channels 100 occur simultaneously with lower pressures of the trough 410 on top of output channels 200. The water flows from higher to lower pressure areas.

The energy wave devices 10 and/or 20 may easily be affixed under the existing piers and/or new piers may be designed and built with submerged energy wave devices, such that the incoming waves are converted in electric power.

Additionally, the energy wave devices 10 and/or 20 can be affixed to the sea floor either directly or raised on poles. This is even more desirable when the shoreline needs to be protected from erosion, since the wave energy device 10 and/or 20 acts as a breakwater.

Most of the applications should use the floating configurations, where the wave energy device is being held submerged by floating means. The floating means should be designed such that they can accept ballast water for submerging the wave energy device and discharge water for raising the wave energy device for service and towing purposes. These are well known techniques in the industry and therefore don't need to be detailed. The floating means having an adjustable elevation can take additional variable loads, like a raised platform on which dwelling and service facilities can be built, facilities for hydrogen making, desalinating water or any other business like factories or hydroponic cultures. These floating islands can be moored in deep water not too far from shore for delivering power to the grid through subsea cables or they can sail under their own power to coastal locations to deliver services like electric power or desalinated water. Alternately, they can be geo stationary and deliver services as refueling stations or prisons in the middle of the sea. Since they absorb the waves by discharging the crest into the troughs, the water behind them is smooth and can be used for aquaculture, mooring vessels or floating apartments hooked to services as electric power, desalinated water, and sewer.

Because the water from the water crest gets continuously discharged in the trough the water that goes past the wave energy device will smoothly facilitate aquaculture and mooring of vessels and floating dwelling units.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A device for converting the energy of waves in continuous flow of water comprising:
   one or more input channels;
   one or more output channels;
   one or more passages;
   one or more turbines; and
   one or more generators;
   wherein said one or more turbines are within said one or more passages;
   wherein said one or more input channels have one or more input valves;
   wherein said one or more output channels have one or more output valves;
   wherein said one or more input channels are connected to said one or more output channels through said one or more passages;
   wherein said device for converting the energy of waves is submerged under a surface of a body of water such that at list a crest and a trough occur on top of the device simultaneously;
   wherein a plurality of waves passes over said device;
   wherein said plurality of waves have a crest and a trough along each wave length;
   wherein a stream of water enters said one or more input channels through said one or more input valves under pressure of said plurality of wave crests, wherein said stream of water is prevented from exiting through said one or more input valves such that said stream of water passes through said one or more passages to said one or more output channels and out through said one or more output valves;
   wherein said stream of water is prevented from entering through said one or more output valves; and
   wherein said stream of water is converted into a usable energy source by said one or more turbines and said one or more generators.

2. The device in claim 1, further comprising a flotation device;
   wherein said device and said floatation device host one or more wind turbines.

3. The device in claim 1, further comprising a flotation device;
   wherein said device and said floatation device host one or more water desalination facilities.

4. The device in claim 1, further comprising a flotation device;
   wherein said device and said floatation device host one or more hydrogen making facilities.

5. The device in claim 1, further comprising a flotation device;
   wherein said device and said floatation device host one or more lodging or dwelling units.

6. The device of claim 1, wherein said one or more input valves are comprised of one or more input flaps and one or more input grills;
   wherein said one or more output valves are comprised of one or more output flaps and one or more output grills;
   wherein said one or more input grills are exterior to said one or more input flaps and wherein said one or more input grills prevent said one or more input flaps from opening outward; and
   wherein said one or more output grills are interior to said one or more output flaps and wherein said one or more output grills prevent said one or more output flaps from opening inward.

7. The device in claim 6, further comprising a flotation device;
   wherein said device and said floatation device host one or more wind turbines.

8. The device in claim 6, further comprising a flotation device;
   wherein said device and said floatation device host one or more water desalination facilities.

9. The device in claim 6, further comprising a flotation device;
   wherein said device and said floatation device host one or more hydrogen making facilities.

10. The device in claim 6, further comprising a flotation device;
    wherein said device and said floatation device host one or more lodging or dwelling units.

11. The device of claim 1, further comprising a flotation device;
    wherein said device and said floatation device host one or more lodging or dwelling units, one or more hydrogen making facilities; one or more water desalination facilities; and one or more wind turbines;
    wherein said device and said floatation device provides an area of calm water feasible for aquaculture, water sports, and mooring facilities.

12. The device of claim 1, wherein said device is part of a pier.

13. The device of claim 1, wherein said device is affixed to the sea floor.

14. The device of claim 1, wherein said device is part of a floating structure.

15. The device of claim 14, wherein said floating structure travels on said body of water to deliver electric power and desalinated water to remote coastal locations.

16. The device of claim 14, wherein said floating structure is geostationary under its own power.

17. The device of claim 14, wherein said floating structure is a platform for one or more businesses selected from the businesses consisting of factories, aquaculture farms, and hydroponic farms.

18. The device of claim 14, wherein said floating structure is a breakwater to protect the seashore from erosion.

19. The device of claim 14, wherein said floating structure is a refueling station for vessels.

20. The device of claim 14, wherein said floating structure is a prison.

* * * * *